US008390986B2

(12) United States Patent
Oh et al.

(10) Patent No.: US 8,390,986 B2
(45) Date of Patent: Mar. 5, 2013

(54) SUPER CAPACITOR FOR HIGH POWER

(75) Inventors: Young Joo Oh, Seoul (KR); Jung Rag Yoon, Yongin-si (KR); Kyung Min Lee, Paju-si (KR); Sang Won Lee, Suwon-si (KR)

(73) Assignee: Samhwa Capacitor Co., Ltd. (KR)

( * ) Notice: Subject to any disclaimer, the term of this patent is extended or adjusted under 35 U.S.C. 154(b) by 172 days.

(21) Appl. No.: 13/069,973

(22) Filed: Mar. 23, 2011

(65) Prior Publication Data

US 2011/0235242 A1 Sep. 29, 2011

(30) Foreign Application Priority Data

Mar. 24, 2010 (KR) .................. 10-2010-0026180
May 24, 2010 (KR) .................. 10-2010-0048012

(51) Int. Cl.
*H01G 9/00* (2006.01)

(52) U.S. Cl. ........ 361/502; 361/503; 361/504; 361/523; 361/528; 361/540

(58) Field of Classification Search .................. 361/502, 361/503–504, 516–519, 523–525, 528–529, 361/535–536, 540–541; 29/25.01, 25.03
See application file for complete search history.

(56) References Cited

U.S. PATENT DOCUMENTS

| | | | |
|---|---|---|---|
| 4,975,806 A | 12/1990 | Clouse | |
| 6,282,081 B1 * | 8/2001 | Takabayashi et al. | 361/502 |
| 6,845,003 B2 * | 1/2005 | Oyama et al. | 361/502 |
| 6,911,281 B2 * | 6/2005 | Sonoda et al. | 429/199 |
| 6,914,768 B2 * | 7/2005 | Matsumoto et al. | 361/502 |
| 7,286,335 B2 * | 10/2007 | Hozumi et al. | 361/502 |
| 7,307,830 B2 * | 12/2007 | Gallay et al. | 361/502 |
| 7,474,520 B2 * | 1/2009 | Kashihara et al. | 361/502 |
| 7,826,197 B2 * | 11/2010 | Gramm et al. | 361/502 |

* cited by examiner

Primary Examiner — Nguyen T Ha
(74) Attorney, Agent, or Firm — Cantor Colburn LLP

(57) ABSTRACT

Provided is a high power super capacitor including: a bobbin; an electrode assembly being wound into the bobbin to be in a jellyroll type; a conductive connection member being formed in each of one end and another end of the electrode assembly using electric energy; and a plug being inserted into each of one end and another end of the bobbin, and being bonded with the conductive connection member using electric energy to be electrically connected to the electrode assembly. The electrode assembly may include a first electrode plate having a first polarity and including an inactive material area collector where the conductive connection member is formed in the one end of the electrode assembly, a second electrode plate having a second polarity and including another inactive material area collector where the conductive connection member is formed in the other end of the electrode assembly, and a separator being disposed between the first electrode plate and the second electrode plate to insulate between the first electrode plate and the second electrode plate. Accordingly, the high power super capacitor may increase a contact area without decreasing an area of electrode active material layer and may decrease an equivalent series resistance by forming a conductive connection member using electric energy, thereby enhancing an exothermic characteristic and being applied to a high power field.

22 Claims, 9 Drawing Sheets

SUPER CAPACITOR FOR HIGH POWER

CROSS-REFERENCE TO RELATED APPLICATION

This application claims the benefit of Korean Patent Application No. 10-2010-0026180, filed on Mar. 24, 2010 and Patent Application No. 10-2010-0048012, filed on May 24, 2010 in the Korean Intellectual Property Office, the disclosure of which is incorporated herein by reference.

BACKGROUND OF THE INVENTION

1. Field of the Invention

The present invention relates to a high power super capacitor, and more particularly, to a high power super capacitor that may increase a contact area without decreasing an area of an electrode active material layer and may decrease an equivalent series resistance by forming a conductive connection member using electric energy.

2. Description of the Related Art

A super capacitor uses an electrode assembly of a jellyroll type. The electrode assembly of the jellyroll type may be manufactured by inserting a separator between a first electrode plate and a second electrode plate that are formed by applying an electrode active material over a collector and drying the applied electrode active material, and then performing roll pressing and cutting, and by winding the first electrode plate and the second electrode plate with the inserted separator. Hereinafter, a conventional super capacitor employing the electrode assembly of the jellyroll type constructed as above will be described.

As shown in FIG. 1, the conventional super capacitor may includes an electrode assembly 1, a plurality of electrode tabs 2, and a plurality of second electrode tabs 3.

The electrode assembly 1 may include a separator 4, a first electrode plate 5, and a second electrode plate 6.

The separator 4 is disposed between the first electrode plate 5 and the second electrode plate 6 to thereby prevent the first electrode plate 5 and the second electrode plate 6 from being physically bonded with each other and thereby being electrically connected to each other.

The first and second electrode plates 5 and 6 include collectors 5a and 6a, and electrode active material layers 5b and 6b, respectively. The electrode active material layers 5b and 6b are respectively applied on both sides of the collectors 5a and 6a. Here, each of the electrode active material layers 5b and 6b includes conductive carbon, active carbon, and a binding agent. A contact area A where the electrode active material layer 5b is not applied is formed in the collector 5a. Although not illustrated in FIG. 1, the contact area A where the electrode active material layer 6b is not applied is formed in the collector 6a. As described above, the contact area A may be formed by removing the electrode active material layers 5b and 6b sprayed in an area where the contact area A is to be formed using a physical method employing a wiper and the like.

When the contact area A is formed in each of the collectors 5a and 6a, the first electrode tab 2 or the second electrode tab 3 may be bounded to each contact area A using a physical method such as pressing and the like. When the first electrode tab 2 or the second electrode tab 3 is pressed to the contact area A, the separator 4 is inserted between the first electrode plate 5 and the second electrode plate 6 and thereby is wound, whereby the electrode assembly 1 of the jellyroll type is formed as shown in FIG. 1. Next, the conventional super capacitor is manufactured by connecting an external lead terminal (not shown) to the first electrode tab 2 or the second electrode 3.

Like the conventional super capacitor, when the contact area A is formed in each of the collectors 5a and 6a, and the first electrode tab 2 or the second electrode tab 3 is bonded to the contact area A, a power loss and an exothermic characteristic may be deteriorated by increasing the number of first electrode tabs 2 and the number of second electrode tabs 3, and by distributing current applied to the collectors 5a and 6a.

For example, when a single contact area A is formed in each of the collectors 5a and 6a and then the first electrode tab 2 or the second electrode tab 3 is bonded to the corresponding contact area A, the current may not be uniformly distributed whereby the power loss may increase. In addition, due to an equivalent series resistance, the exothermic characteristic ($P=I^2 \times R$) may occur in a portion where the contact area A is bonded with the first electrode tab 2 or the second electrode tab 3. Here, I denotes the current and R denotes the equivalent series resistance. When n contact areas A are formed in each of the collectors 5a and 6a and then n first electrode tabs 2 or n second electrode tabs 3 are respectively bonded to the n contact areas A in order to enhance the above disadvantage, the current may be uniformly distributed through the first electrode tabs 2 or the second electrode tabs, whereby the power loss may be deteriorated. In addition, equivalent series resistances occurring in contact areas may be connected to each other in parallel, whereby the exothermic characteristic P may be reduced to $I^2 \times R/n$. Here, n denotes the number of equivalent series resistances R.

As described above, in the conventional super capacitor, when significantly increasing the number of contact areas on a collector into consideration of the power loss or the exothermic characteristic, an area of a contact area may increase. Due to a decrease in an area of an electrode active material layer, a capacity deterioration may occur. When decreasing the number of contact areas, the conventional super capacitor may not be employed in a high power field due to an increase in the power loss or the exothermic characteristic.

SUMMARY OF THE INVENTION

An aspect of the present invention provides a high power super capacitor that may increase a contact area without decreasing an area of an electrode active material layer, and may decrease an equivalent series resistance by forming a conductive connection member using electric energy.

Another aspect of the present invention also provides a high power super capacitor that may enhance the current distribution effect by increasing a contact area without decreasing an area of an electrode active material layer and may decrease a power loss, and may also enhance an exothermic characteristic by decreasing an equivalent series resistance, thereby being applicable to a high power field.

Another aspect of the present invention also provides a high power super capacitor that may employ a bobbin when winding an electrode assembly in a jellyroll type and thereby making it easier to wind the electrode assembly and maintaining durability, and may more easily and firmly insert a plug into the bobbin.

According to an aspect of the present invention, there is provided a high power super capacitor, including: a bobbin; an electrode assembly being wound into the bobbin to be in a jellyroll type; a conductive connection member being formed in each of one end and another end of the electrode assembly using electric energy; and a plug being inserted into each of one end and another end of the bobbin, and being bonded with the conductive connection member using electric energy to thereby be electrically connected to the electrode assembly. The electrode assembly may include a first electrode plate having a first polarity and including an inactive material area collector where the conductive connection member is formed in the one end of the electrode assembly, a second electrode plate having a second polarity and including another inactive material area collector where the conductive connection member is formed in the other end of the electrode assembly, and a separator being disposed between the first electrode plate and the second electrode plate to thereby insulate between the first electrode plate and the second electrode plate.

According to another aspect of the present invention, there is provided a high power super capacitor, including: a bobbin; an electrode assembly being wound into the bobbin to be in a jellyroll type; a conductive connection member being formed in each of one end and another end of the electrode assembly using electric energy; a plug being inserted into each of one end and another end of the bobbin, and being bonded with the conductive connection member using electric energy to thereby be electrically connected to the electrode assembly; an external terminal being combined with the plug to be electrically connected to the conductive connection member; an insulating gasket being disposed in the external terminal to wrap around the external terminal; and a housing being combined with the insulating gasket to seal the electrode assembly. The electrode assembly may include a first electrode plate having a first polarity and including an inactive material area collector where the conductive connection member is formed in the one end of the electrode assembly, a second electrode plate having a second polarity and including another inactive material area collector where the conductive connection member is formed in the other end of the electrode assembly, and a separator being disposed between the first electrode plate and the second electrode plate to thereby insulate between the first electrode plate and the second electrode plate.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
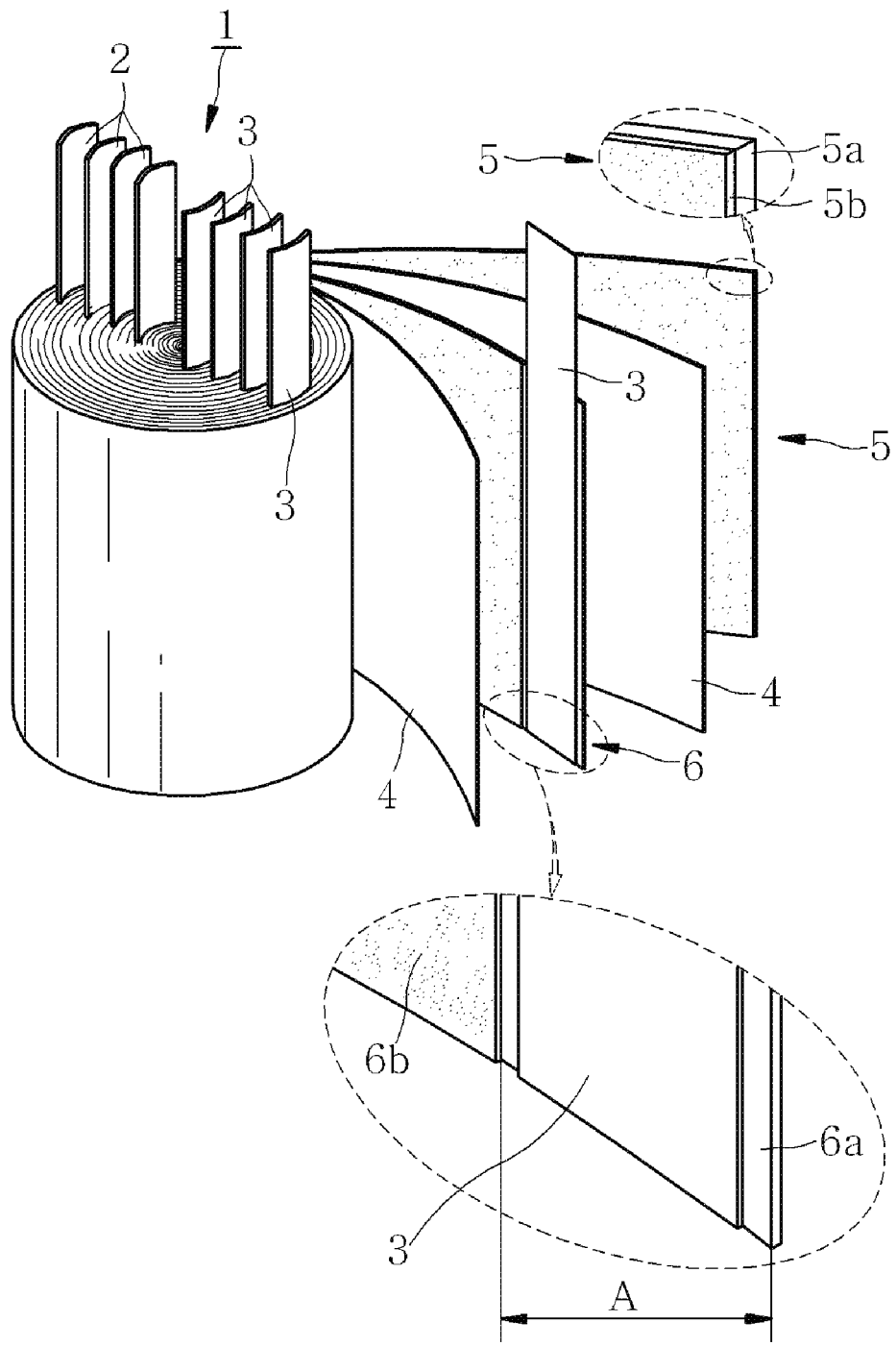
FIG. 1 is a perspective view of a conventional super capacitor.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of a high power super capacity according to the present invention will be described with reference to the accompanying drawings.

Figure 2:
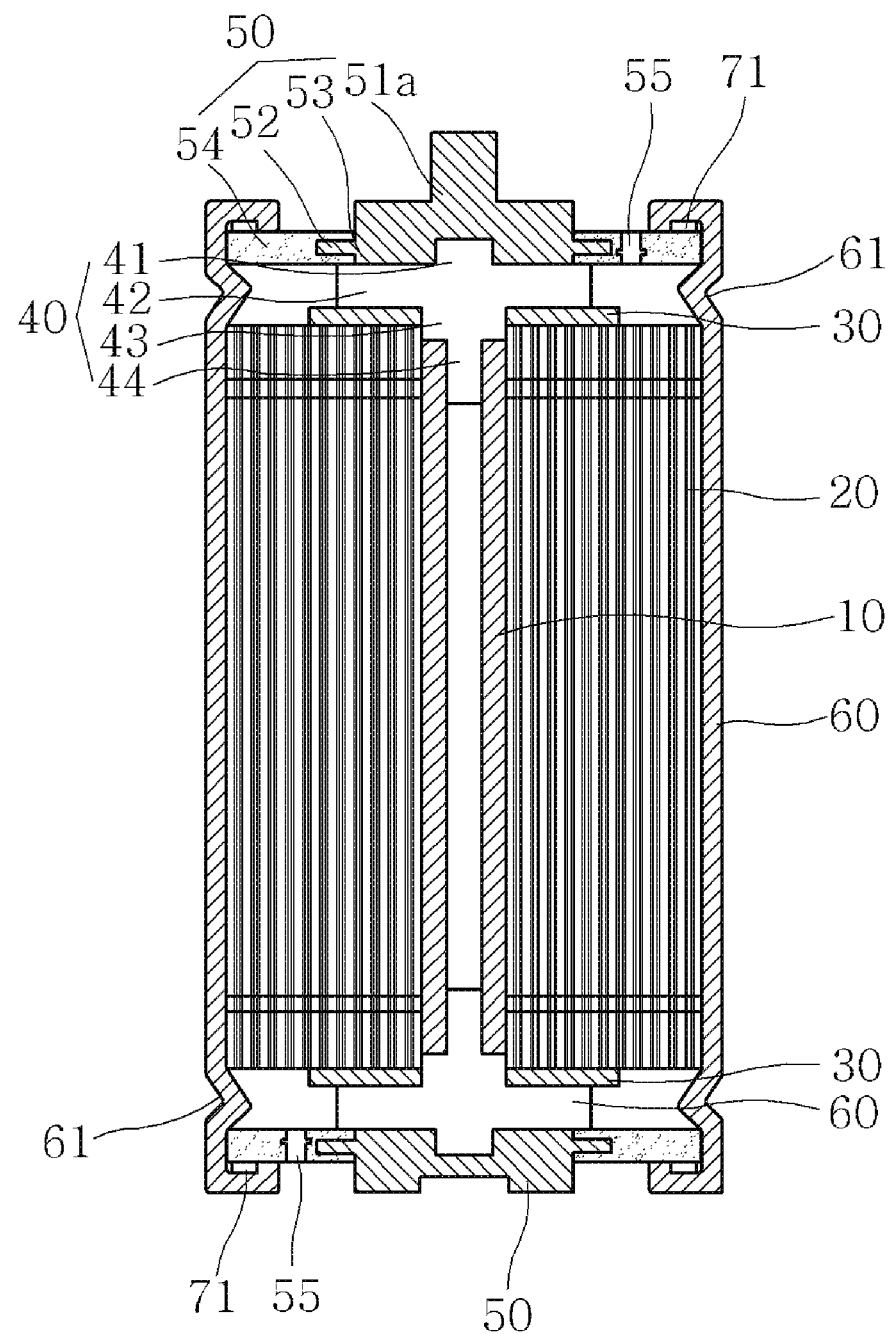
FIG. 2 is a cross-sectional view of a high power super capacitor according to the present invention.
Figure 3:
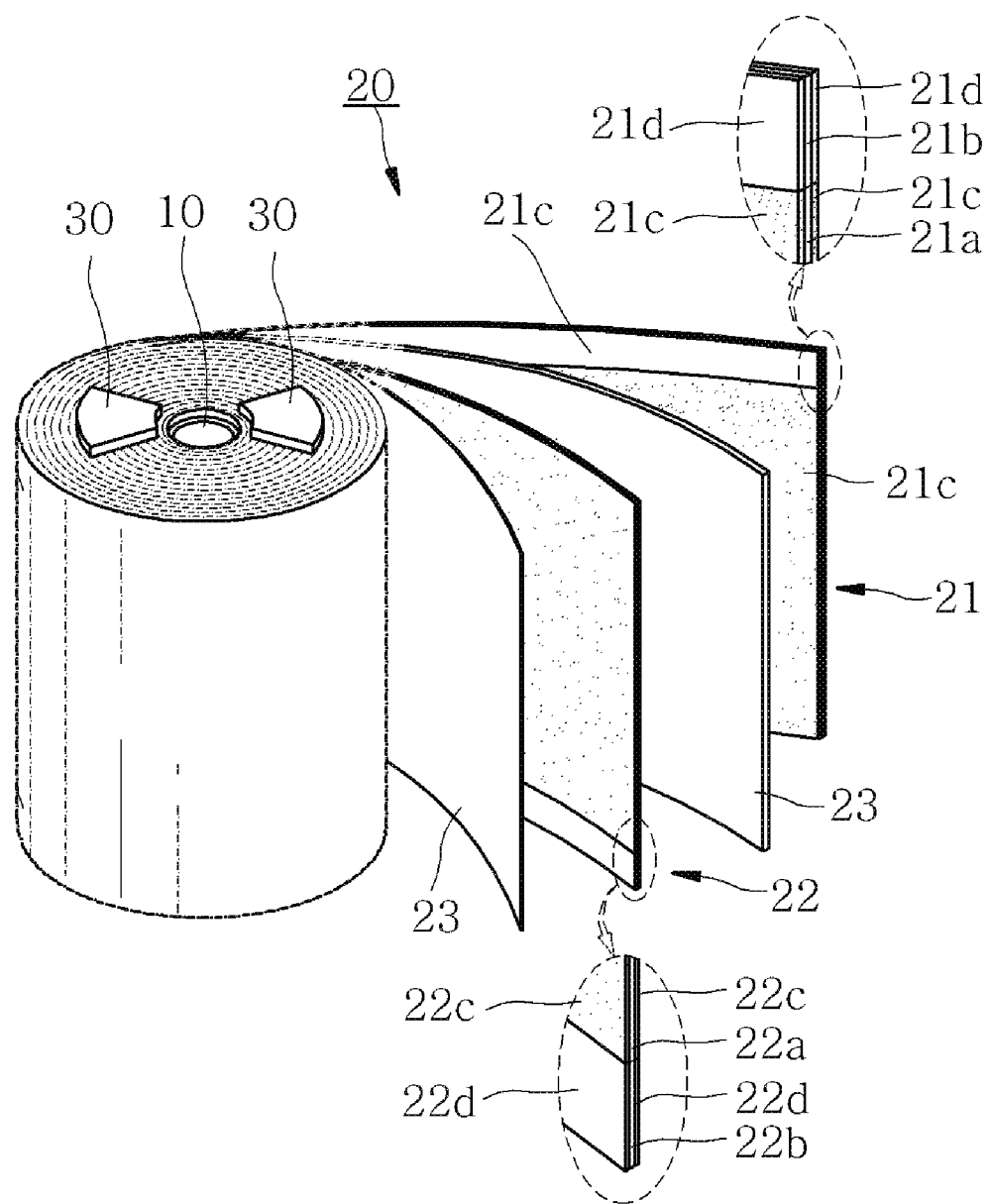
FIG. 3 is a perspective view of an electrode assembly of FIG. 2.
Figure 4:
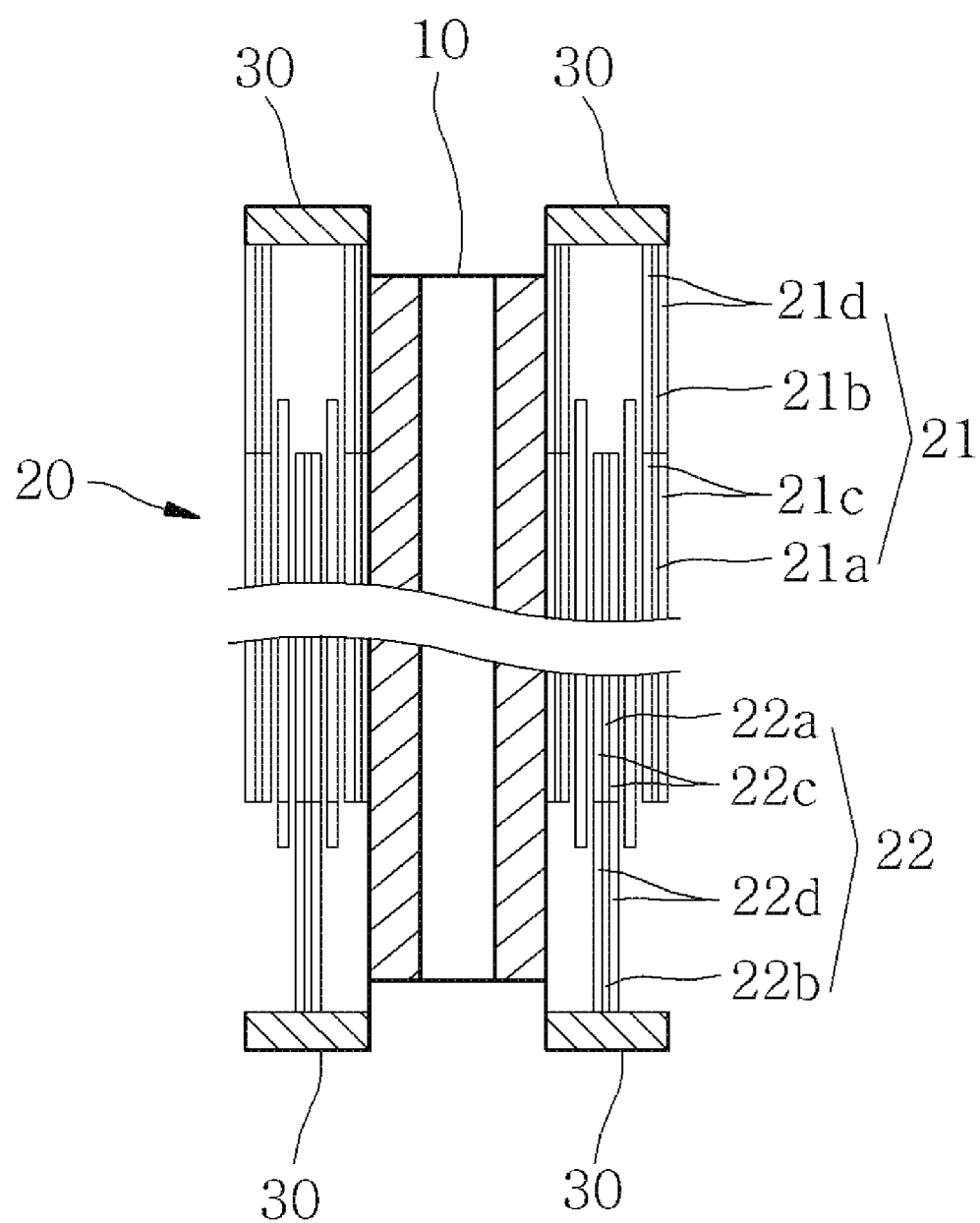
FIG. 4 is a partially enlarged cross-sectional view of a portion of the electrode assembly of FIG. 3.

As shown in FIGS. 2 through 4, a high power super capacity according to an embodiment of the present invention includes a bobbin 10, an electrode assembly 20, a conductive connection member 30, and a plug 40. In the above configuration, the electrode assembly 20 is wound into the bobbin 10. Specifically, the electrode assembly 20 is wound into the bobbin 10 to be in a jellyroll type. The conductive connection member 30 is formed in each of one end and another end of the electrode assembly 20 using electric energy such as a metal spray. The plug 40 is inserted into each of one end and another end of the bobbin 10 and is bonded with the conductive connection member 30 using electric energy such as a laser welding to thereby be electrically connected to the electrode assembly 20.

Hereinafter, the high power super capacitor according to the present invention constructed as above will be described in further detail.

The bobbin 10 employs a material that is rigid to avoid transformation occurring due to force occurring when winding the electrode assembly 20 in a jellyroll type, that has an insulating property to be insulated from the electrode assembly 20, and that has no reactivity with an electrolyte impregnated into the electrode assembly 20. As described above, the bobbin 10 may be formed of an insulating resin or a plastic material based on rigidity, the insulating property, and the reactivity with the electrolyte.

Figure 6:
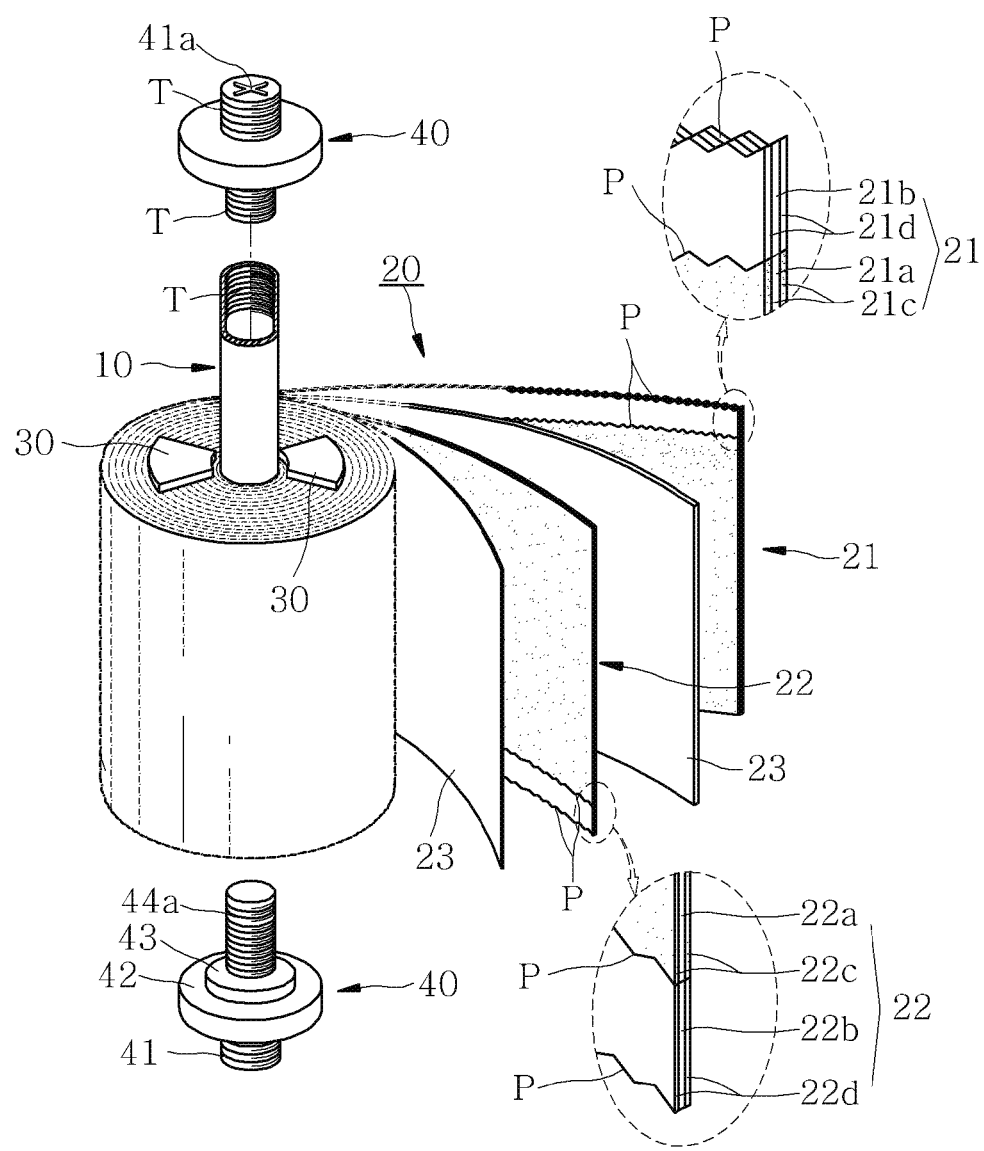
FIG. 6 is a perspective view illustrating another embodiment of the electrode assembly of FIG. 2.
Figure 8:
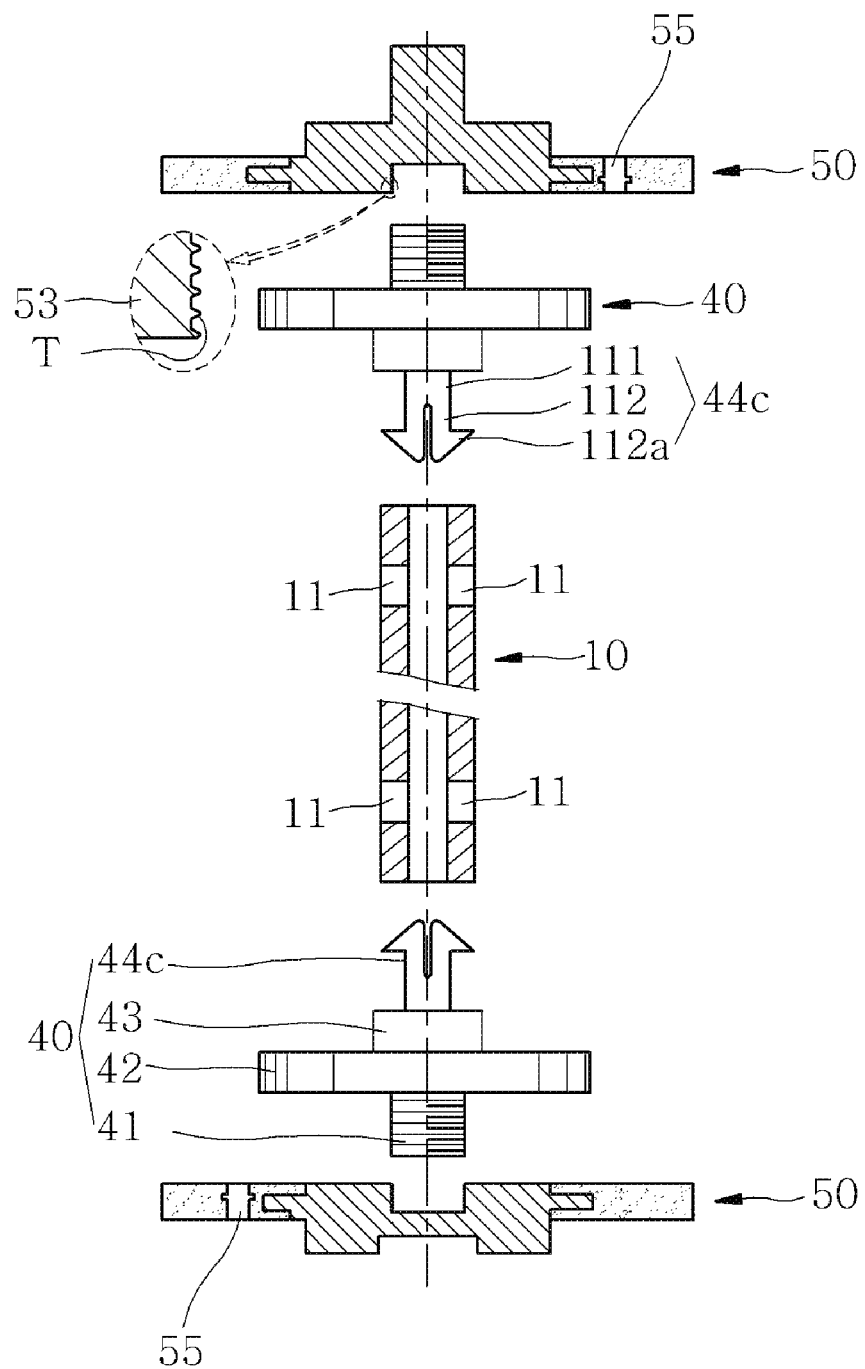

The bobbin 10 has a hollow inside to be inserted with the plug 40 as shown in FIG. 2, and is formed with a screw thread T or a stopping groove 11 (see FIG. 8) in each of one end and another end of the bobbin 10 as shown in FIG. 6 and FIG. 8.

Figure 7:
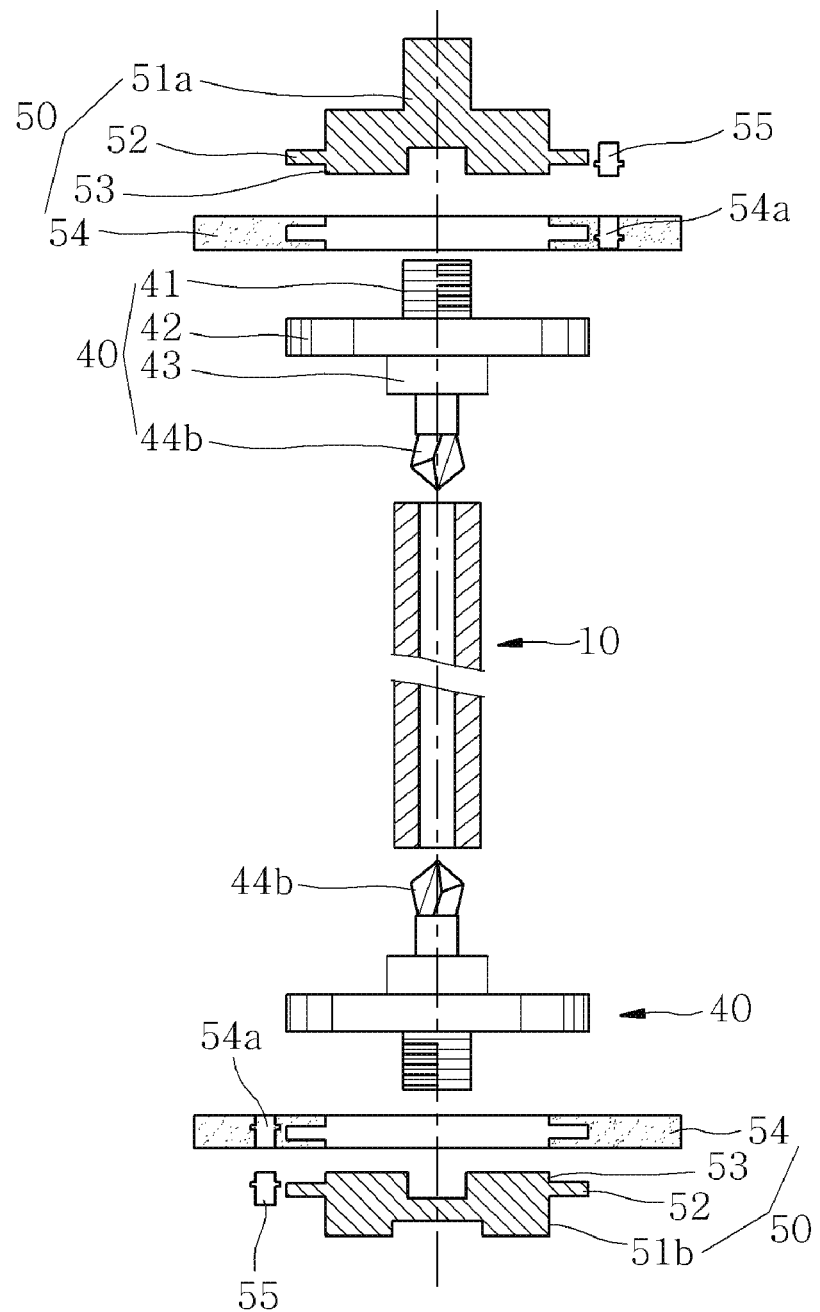
FIG. 7 and FIG. 8 are cross-sectional views illustrating another embodiment of a plug of FIG. 2.

When a tab member 44 of the plug 40 is a drill screw-type tab member 44b (see FIG. 7) as shown in FIG. 7, the bobbin 10 may pressurize and thereby insert the plug 40 whereby the screw thread T may not be separately formed. Also, when the tab member 44 of the plug 40 is a screw-type tab member 44a as shown in FIG. 6, the screw thread T may be formed in each of the one and the other end of the bobbin 10. When the tab member 44 of the plug 40 is a latch-type tab member 44c (see FIG. 8) as shown in FIG. 8, a plurality of stopping grooves 11 for fixing the latch-type tab member 44c may be formed in the bobbin 10.

As shown in FIG. 3 through FIG. 6, the electrode assembly 20 may include a first electrode plate 21, a second electrode plate 22, and a separator 23.

The first electrode plate 21 may have a first polarity and include an inactive material area collector 21b where the conductive connection member 30 is formed in the one end of the electrode assembly 20. The second electrode plate 22b may have a second polarity and include an inactive material area collector 22b where the conductive connection member 30 is formed in the other end of the electrode assembly 20. Here, the first polarity may be a cathode when the second polarity is an anode, and may be an anode when the second polarity is a cathode. The separator 23 may be disposed between the first electrode plate 21 and the second electrode plate 22 to thereby insulate between the first electrode plate 21 and the second electrode plate 22.

Hereinafter, a configuration of the first electrode plate 21 and the second electrode plate 22 insulated by the separator 23 will be further described.

The first electrode plate 21 and the second electrode plate 22 include active material area collectors 21a and 22a, the inactive material area collectors 21b and 22b, and electrode active material layers 21c and 22c, respectively.

Figure 5:
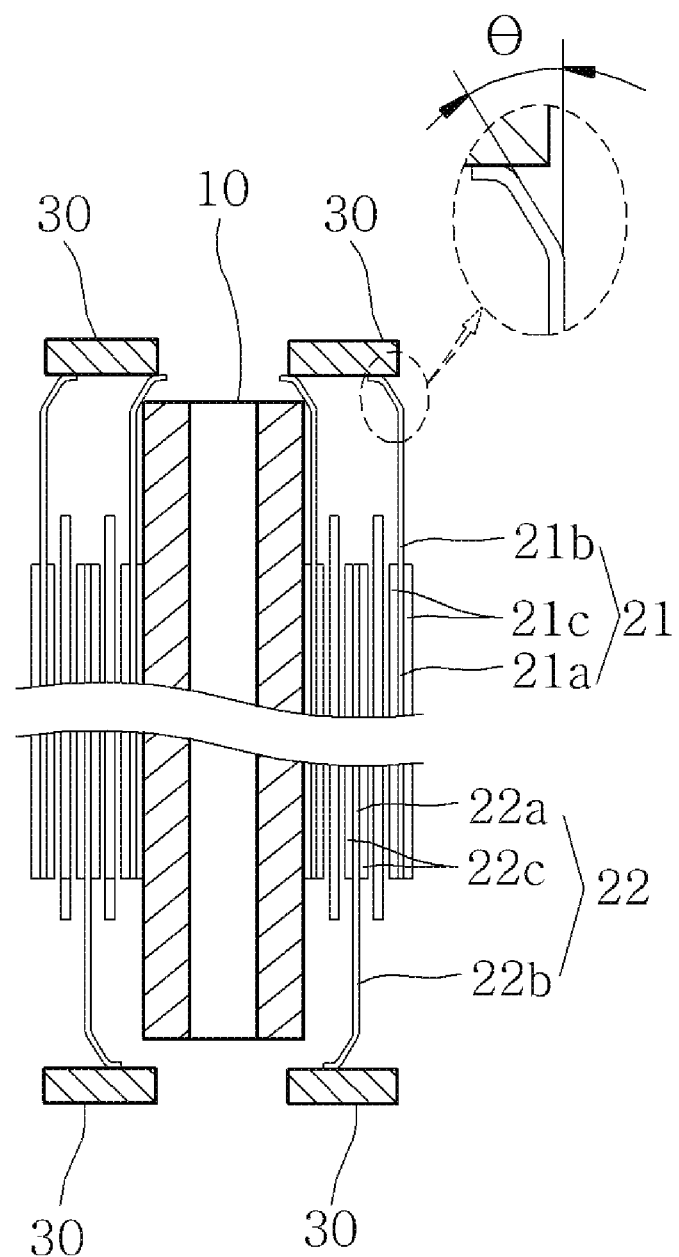
FIG. 5 is a partially enlarged cross-sectional view illustrating another embodiment of the electrode assembly of FIG. 4.

The active material area collectors 21a and 22b may be integrally formed with the inactive material area collectors 21b and 22b, respectively. The inactive material area collectors 21b and 22b may be formed to be extended along the active material area collectors 21a and 22a and thereby be electrically connected to the conductive connection member 30. As shown in FIG. 6, an unevenness P may be formed in one end or another end of each of the inactive material area collectors 21b and 22b, thereby increasing a contact area with the conductive connection member 30 being formed using electric energy, that is, a metal spray method, and enhancing a contact strength or an electrical characteristic. In addition, so that the contact area with the conductive connection member 30 may increase, the inactive material area collectors 21b and 22b may be curved to be inclined at 30 degrees to 60 degrees like an angle θ as shown in FIG. 5. As shown in FIG. 3, FIG. 4, and FIG. 6, conductive contact members 21d and 22d may be formed on each of both surfaces of the inactive material area collectors 21b and 22b, respectively. As shown in FIG. 6, an unevenness P may be formed in one end or another end of the conductive contact members 21d and 22d along the lengthwise direction of the inactive material area collectors 21b and 22b, thereby increasing a contact area of the electrode active material layers 21c and 22c, increasing the contact strength or the contact area and enhancing the electrical characteristic.

The electrode active material layers 21c and 22c may be sprayed over each of both surfaces of the active material area collectors 21a and 22a along the lengthwise direction, and may include active carbon of 50 wt % to 98 wt %, conductive carbon of 1 wt % to 25 wt %, and a bonding agent of 1 wt % to 25 wt %. The active carbon selects and thereby uses at least one of active carbon, carbon aerosol, mesoporous carbon, metal-doped carbon, and metal-doped oxide, and the bonding agent selects and thereby uses at least one of polytetrafluoroethylene (PTFE), carboxymethylcellulose (CMC), and stylen-buthylene-rubber (SBR). Another embodiment of the electrode active material layers 21c and 22c may include transition metal-doped carbon aerosol of 50 wt % to 87 wt %, active carbon of 5 wt % to 20 wt %, a conductive material of 3 wt % to 10 wt %, and a binder of 5 wt % to 20 wt %. Here, the conductive material uses super-p, and the binder selects and thereby uses one from a group including polyvinylienefluoride (PVDF), polyvinyl alcohol (PVA), and polyvinylpyrrolidone (PVP).

According to still another embodiment of the electrode active layers 21c and 22c, an anode material or a cathode material may be used depending on a polarity of the first electrode plate 21 and a polarity of the second electrode plate 22. For example, when the first electrode plate 21 is used as an anode, the anode material may be used for the electrode active material layer 21c. When the second electrode plate 22 is used as a cathode, the cathode material may be used for the electrode active material layer 22c. The anode material includes active carbon of 60 wt % to 75 wt %, an anode active material of 5 wt % to 15 wt % that selects and thereby uses one of spinel, olivine, and layered base, a conductive material of 1 wt % to 10 wt %, and a binder of 5 wt % to 15 wt %. The cathode material includes a cathode active material of 60 wt % to 90 wt % using carbon-coated $Li_4Ti_5O_{12}$, a conductive material of 5 wt % to 20 wt %, and a binder of 5 wt % to 15 wt %. Here, the conductive material uses super-p, and the binder selects and thereby use one of a group including polyvinylienefluoride (PVDF), polyvinyl alcohol (PVA), and polyvinylpyrrolidone (PVP).

As shown in FIG. 6, the electrode active material layers 21c and 22c including materials of various embodiments may be formed with the unevenness P in one ends or another ends of the electrode active material layers 21c and 22c along the lengthwise direction of the active material area collectors 21a and 22a, thereby increasing a contact area with the conductive contact members 21d and 22d, enhancing the electrical characteristic or the contact strength. Specifically, the contact strength may be enhanced by forming the unevenness in each of contact portions between the electrode active material layers 21c and 22c and the conductive contact members 21d and 22d. The electrical characteristic may be enhanced by increasing the contact area.

The conductive connection member 30 may be formed in each of one end and the other end of the electrode assembly 20 using the electric energy such as a metal spray method to thereby electrically connect the conductive contact members 21d and 22d and the plug 44. The conductive connection member 30 may be arranged in a sector shape in each of one end and another end of the electrode assembly 20 in order to secure the electrolyte impregnation space.

The plug 40 is formed of a conductive material such as a metal, and includes a head member 41, a disk member 42, a stopper member 43, and the tab member 44.

As shown in FIG. 6, a cross-type groove 41a is formed in one end of the head member 41, and a screw thread T is formed on an outer circumferential surface of the head member 41. The cross-type groove 41a is formed to insert the plug 40 into the bobbin 10 using an instrument (not shown) such as a screwdriver and the like. The screw thread T is formed to be screw combined with an external terminal 50. The disk member 42 is formed on the head member 41 to thereby be bonded with the conductive connection member 30 using the electric energy such as laser welding. The stopper member 43 is formed on the disk member 42 to contact with the bobbin 10 and thereby be supported.

The tab member 44 is formed on the stopper member 43 to be inserted into and thereby be combined with the bobbin 10. As shown in FIG. 6 through FIG. 8, one of the screw-type tab member 44a, the drill screw-type tab member 44b, and the latch-type tab member 44c may be used for the tab member 44. As shown in FIG. 6, the screw thread T is formed on the outer circumferential surface of the screw-type tab member 44a to be screw combined with the screw thread T formed in the bobbin 10. As shown in FIG. 7, the drill screw-type tab member 44b may be combined with the bobbin 10 due to a forced fit pressing. As shown in FIG. 8, the latch-type tab ember 44c includes an insertion body 111 and a plurality of latch members 112. The insertion body 111 may be formed on the stopper member 43. The plurality of latch members 112 may be spaced apart from the insertion body 111 to be inserted into the stopping groove 11 formed in the bobbin 10. A cover member 112a may be formed in each of the latch members 112 to be inserted into the stopping groove 11 formed in the bobbin 10.

The external terminal 50 may be formed of a conductive material, and may include a lead connection member 51, a cover member 52, a combining hollow member 53, and a molding member 54 as shown in FIG. 6.

As shown in FIG. 7, the lead connection member 51 may use a block type lead connection member 51a or a concave type lead connection member 51b. When the concave type lead connection member 51b is used as a cathode, the block type lead connection member 51a may be used as an anode.

The lead cover member 52 is formed on the lead connection member 51, and the combining hollow member 53 is formed on the cover member 52 to be combined with the plug 40 and thereby be electrically connected to the electrode assembly 20. As shown in FIG. 8, the combining hollow member 53 is formed with a screw thread T in an inner circumferential surface of the combining hollow member 53 to be screw-combined with the plug 40. Specifically, the combining hollow member 53 is screw-combined with the screw thread T formed in the outer circumferential surface of the head member 41 of the plug 40 to thereby be combined with the plug 40.

The molding member 54 is molded with the cover member 52 to thereby be combined with a housing 60 using a seaming scheme. A vent hole 54a to be inserted with a vent cover member 55 is formed in the molding member 54. The vent hole 54a is formed to prevent the high power super capacitor of the present invention from being exploded due to a pressure occurring when an abnormality occurs.

The housing 60 is combined with the external terminal 50 using the seaming method to thereby seal the electrode assembly 20, and uses an aluminum can. A groove 61 is formed in each of one end and another end of the housing 60 using a grooving scheme. The groove 61 functions as a stopper supporting the external terminal 50. An insulating sealing member 71 may be disposed between the external terminal 50 and the housing 60 to thereby seal the housing 60.

Hereinafter, a high power super capacitor according to another embodiment of the present invention will be described with reference to FIG. 9.

Figure 9:
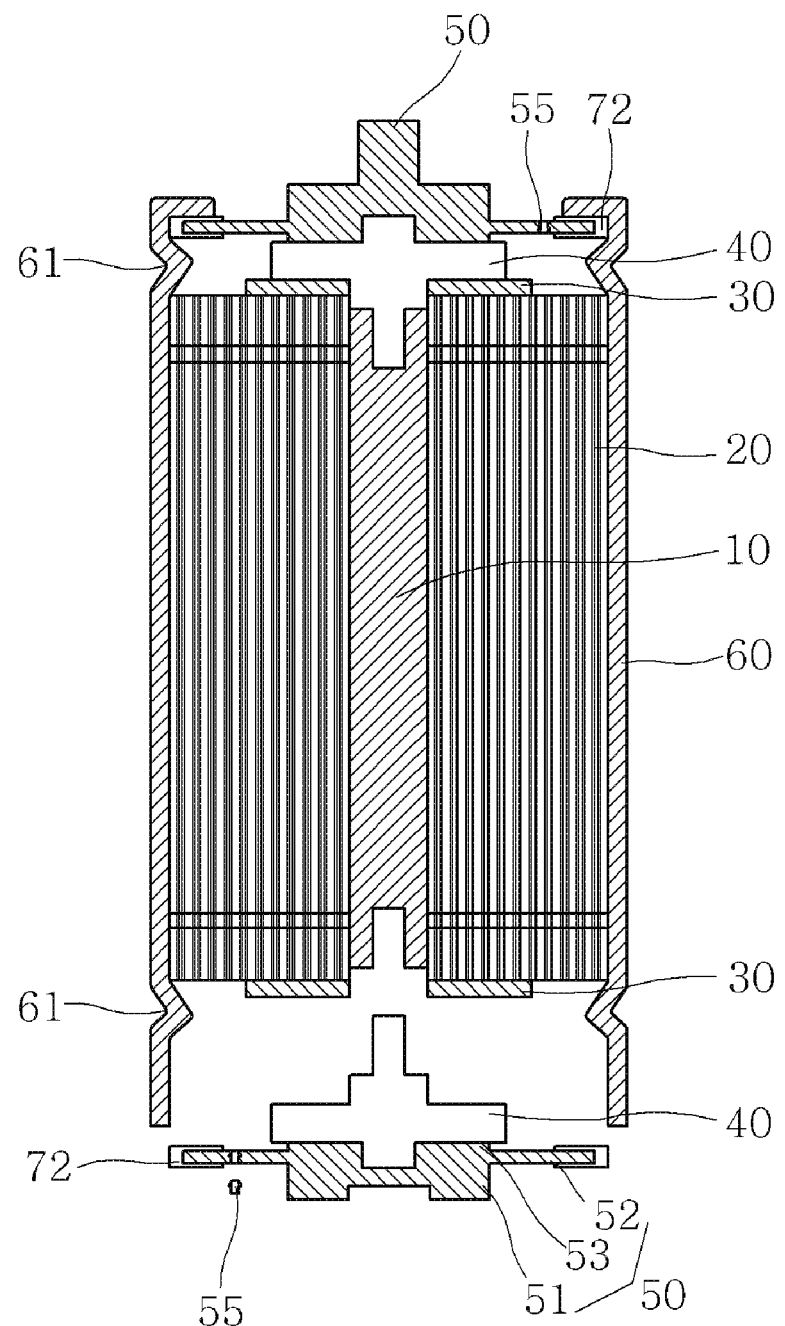
FIG. 9 is a cross-sectional view illustrating another embodiment of a bobbin and an external terminal of FIG. 2.

As shown in FIG. 9, the high power supper capacitor includes the bobbin 10, the electrode assembly 20, the conductive connection member 30, the plug 40, the external terminal 50, an insulating gasket 72, and a housing 60.

The bobbin 10 may be formed of an insulating material. To prevent deformation occurring due to a force by an operation of winding the electrode assembly 20 to be in a jellyroll type and the like, the bobbin 10 with a filled inside may be used for rigidity. A plug insertion groove 12 may be formed in each of one end and another end of the bobbin 10 to be inserted with the plug 10. As shown in FIG. 6 and FIG. 8, the stopping groove 12a to be inserted with the screw type tab member 44a or the latch type tab member 44c may be formed in the plug insertion groove 12.

The electrode assembly 20 may be wound into the bobbin 10 in the jellyroll type. The conductive connection member 30 may be formed in each of one end and another end of the electrode assembly 20 using electric energy. The plug 40 may be inserted into each of the one end and the other end of the bobbin 10 and is bonded with the conductive connection member 30 using the electric energy to thereby be electrically connected to the electrode assembly 20.

The external terminal 50 may be combined with the plug 40 to thereby be electrically connected to the conductive connection member 30, and may includes the lead connection members 51a and 51b, the cover member 52, and the combining hollow member 53. The lead connection members 51a and 51b and the combining hollow member 53 according to another embodiment of the present invention may be configured to be the same as the lead connection members 51a and 51b and the combining hollow member 53 of the external terminal 50 according to an embodiment of the present invention described above with reference to FIG. 7 and FIG. 8 and thus, further detailed description related thereto will be omitted here. In FIG. 9, the vent hole 51 to be inserted with the vent cover member 55 is formed in the cover member 52, and is connected to the housing 60 via the insulating gasket 72 instead of being directly connected to the housing 60, which is different from the aforementioned embodiment. This is to prevent the external terminal 50 having conductivity from contacting with the housing 60 including an aluminum can and thereby being electrically connected thereto.

The insulating gasket 72 is disposed on the external terminal 50 to wrap around the external terminal 50. The housing 60 may be combined with the insulating gasket 72 using a seaming scheme to thereby seal the electrode assembly 20. An aluminum can may be used for the housing 60, and an insulating material may be sprayed over an inner circumferential surface of the housing 60 for insulation from the electrode assembly 20. The housing 60 may also be combined with the external terminal 50 using the seaming scheme, and the groove 61 is formed in each of one end and another end of the housing 60. Here, the groove 61 is formed using a grooving scheme. The groove 61 formed using the grooving scheme functions as a stopper for supporting the external terminal 50.

As described above, in a high power super capacitor of the present invention, a power loss and an exothermic characteristic may be enhanced by integrally forming an inactive material area collector in each active material area collector of an electrode assembly along a lengthwise direction, by electrically connecting the inactive material area collector to a conductive connection member, and by distributing a current applied to an inactive material area collector via a plug and the conductive connection member. Specifically, by forming the inactive material area collector in each active material area collector along the longwise direction, a contact area may increase without decreasing an area of an electrode active material layer, thereby enhancing the current distribution effect and decreasing the power loss. In addition, by forming the conductive connection member using the electric energy, the equivalent series resistance may decrease, thereby enhancing the exothermic characteristic and enabling the availability in the high power field.

Also, when winding the electrode assembly to be in a jellyroll type, a bobbin may be used. Accordingly, it is possible to more readily wind the electrode assembly and to maintain the durability. In addition, it is possible to more firmly and easily insert the plug into the bobbin.

What is claimed is:

1. A high power super capacitor, comprising:
   a bobbin;
   an electrode assembly being wound into the bobbin to be in a jellyroll type;
   a conductive connection member being formed in each of one end and another end of the electrode assembly using electric energy; and
   a plug being inserted into each of one end and another end of the bobbin, and being bonded with the conductive connection member using electric energy to thereby be electrically connected to the electrode assembly,
   wherein the electrode assembly comprises a first electrode plate having a first polarity and including an inactive material area collector where the conductive connection member is formed in the one end of the electrode assembly, a second electrode plate having a second polarity and including another inactive material area collector where the conductive connection member is formed in the other end of the electrode assembly, and a separator being disposed between the first electrode plate and the second electrode plate to thereby insulate between the first electrode plate and the second electrode plate.

2. The high power super capacitor of claim 1, wherein the bobbin has a hollow inside to be inserted with the plug, and is formed with a stopping groove or a screw thread in each of the one end and the other end of the bobbin.

3. The high power super capacitor of claim 1, wherein the bobbin includes, in each of the one end and the other end of the bobbin, a plug insertion groove to be inserted with the plug, and a stopping groove or a screw thread is formed in the plug insertion groove.

4. The high power super capacitor of claim 1, wherein the bobbin is formed of an insulating resin or a plastic material.

5. The high power super capacitor of claim 1, wherein each of the first electrode plate and the second electrode plate comprises:
an active material area collector;
an inactive material area collector being formed to be extended along a lengthwise direction of the active material area collector; and
an electrode active material layer being sprayed on each of both surfaces of the active material area collector along the lengthwise direction.

6. The high power super capacitor of claim 5, wherein the inactive material area collector is curved to be inclined at 30 degrees to 60 degrees in order to increase a contact area with the conductive connection member.

7. The high power super capacitor of claim 5, wherein a conductive contact member is formed on each of both surfaces of the inactive material area conductor in order to increase a contact area with the conductive connection member.

8. The high power super capacitor of claim 7, wherein an unevenness is formed in one end or another end of the conductive contact member along a lengthwise direction of the inactive material area collector.

9. The high power super capacitor of claim 7, wherein an unevenness is formed in one end or another end of the electrode active material layer along a lengthwise direction of the active material area collector.

10. The high power super capacitor of claim 5, wherein:
the electrode active material layer includes active carbon of 50 wt % to 98 wt %, conductive carbon of 1 wt % to 25 wt %, and a bonding agent of 1 wt % to 25 wt %, and
the active carbon selects and thereby uses at least one of active carbon, carbon aerosol, mesoporous carbon, metal-doped carbon, and metal-doped oxide, and
the bonding agent selects and thereby uses at least one of polytetrafluoroethylene (PTFE), carboxymethylcellulose (CMC), and stylen-buthylene-rubber (SBR).

11. The high power super capacitor of claim 5, wherein:
the electrode active layer includes transition metal-doped carbon aerosol of 50 wt % to 87 wt %, active carbon of 5 wt % to 20 wt %, a conductive material of 3 wt % to 10 wt %, and a binder of 5 wt % to 20 wt %, and
the conductive material uses super-p, and the binder selects and thereby uses one from a group including polyvinylienefluoride (PVDF), polyvinyl alcohol (PVA), and polyvinylpyrrolidone (PVP).

12. The high power super capacitor of claim 5, wherein:
the electrode active material layer uses an anode material or a cathode material, and
the anode material includes active carbon of 60 wt % to 75 wt %, an anode active material of 5 wt % to 15 wt % that selects and thereby uses one of spinel, olivine, and layered base, a conductive material of 1 wt % to 10 wt %, and a binder of 5 wt % to 15 wt %, and
the cathode material includes a cathode active material of 60 wt % to 90 wt % using carbon-coated $Li_4Ti_5O_{12}$, a conductive material of 5 wt % to 20 wt %, and a binder of 5 wt % to 15 wt %.

13. The high power super capacitor of claim 1, wherein the plug comprises:
a head member;
a disk member being formed on the head member to be bonded with the conductive connection member using electric energy;
a stopper member being formed on the disk member to contact with the bobbin; and
a tab member being formed on the stopper member to be inserted into and thereby be combined with the bobbin.

14. The high power super capacitor of claim 13, wherein a cross-type groove is formed in one end of the head member, and a screw thread is formed on an outer circumferential surface of the head member.

15. The high power super capacitor of claim 13, wherein the tab member corresponds to one of a screw-type tab member, a drill screw-type tab member, and a latch-type tab member.

16. The high power super capacitor of claim 15, wherein:
the latch-type tab member comprises:
an insertion body being formed on the stopper member; and
a plurality of latch members being spaced apart from the insertion body to be inserted into a stopping groove formed in the bobbin, and
a cover member is formed in each of the plurality of latch members to be inserted into the stopping groove formed in the bobbin.

17. The high power super capacitor of claim 1, wherein the plug is formed of a conductive material.

18. The high power super capacitor of claim 1, wherein an insulating sealing member is disposed between the external terminal and the housing and to seal the housing.

19. A high power super capacitor, comprising:
a bobbin;
an electrode assembly being wound into the bobbin to be in a jellyroll type;
a conductive connection member being formed in each of one end and another end of the electrode assembly using electric energy;
a plug being inserted into each of one end and another end of the bobbin, and being bonded with the conductive connection member using electric energy to thereby be electrically connected to the electrode assembly;
an external terminal being combined with the plug to be electrically connected to the conductive connection member;
an insulating gasket being disposed in the external terminal to wrap around the external terminal; and
a housing being combined with the insulating gasket to seal the electrode assembly,
wherein the electrode assembly comprises a first electrode plate having a first polarity and including an inactive material area collector where the conductive connection member is formed in the one end of the electrode assembly, a second electrode plate having a second polarity and including another inactive material area collector where the conductive connection member is formed in the other end of the electrode assembly, and a separator being disposed between the first electrode plate and the second electrode plate to thereby insulate between the first electrode plate and the second electrode plate.

20. The high power super capacitor of claim 19, wherein the external terminal comprises:
a lead connection member;
a cover member being formed on the lead connection member to be combined with the insulating gasket;

a combining hollow member being formed on the cover member to be combined with the plug and thereby be electrically connected to the electrode assembly, wherein the combining hollow member is formed with a screw thread in an inner circumferential surface to be screw-combined with the plug.

21. The high power super capacitor of claim 20, wherein the lead connection member corresponds to a block type lead connection member or a concave type lead connection member.

22. The high power super capacitor of claim 20, wherein the cover member is formed with a vent hole to be inserted with a vent cover member.

* * * * *